US010724872B2

(12) United States Patent
Chiu

(10) Patent No.: US 10,724,872 B2
(45) Date of Patent: Jul. 28, 2020

(54) VEHICLE NAVIGATION PROJECTION SYSTEM AND METHOD THEREOF

(71) Applicants: Inventec (Pudong) Technology Corporation, Shanghai (CN); Inventec Corporation, Taipei (TW)

(72) Inventor: Chaucer Chiu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 463 days.

(21) Appl. No.: 15/622,748

(22) Filed: Jun. 14, 2017

(65) Prior Publication Data

US 2018/0164115 A1    Jun. 14, 2018

(30) Foreign Application Priority Data

Dec. 13, 2016   (CN) .......................... 2016 1 1144718

(51) Int. Cl.
*G01C 21/36* (2006.01)
*G02B 27/01* (2006.01)
(Continued)

(52) U.S. Cl.
CPC ....... *G01C 21/365* (2013.01); *G01C 21/3602* (2013.01); *G01C 21/3647* (2013.01);
(Continued)

(58) Field of Classification Search
CPC .............. G01C 21/365; G01C 21/3602; G01C 21/3632; G01C 21/3697; G01C 21/3647;
(Continued)

(56) References Cited

U.S. PATENT DOCUMENTS

2016/0003636 A1* 1/2016 Ng-Thow-Hing ..... H04N 7/188
701/26
2016/0163108 A1* 6/2016 Kim ........................ G06F 3/013
345/633
(Continued)

FOREIGN PATENT DOCUMENTS

WO    WO-2016056199 A1 *   4/2016    ............. B60R 16/02

*Primary Examiner* — Tuan C To
*Assistant Examiner* — Kelly D Williams
(74) *Attorney, Agent, or Firm* — David R. Stevens; Stevens Law Group

(57) ABSTRACT

The present disclosure illustrates a vehicle navigation projection system and a method thereof. In an embodiment, a projection device disposed on the top of vehicle interior receives and analyzes a current image in front of a driver's seat of vehicle, to obtain a contour of a street in the current image, generate an indication icon based on the contour of the street and a navigation signal, and project the indication icon on a projection glass served as windshield of the vehicle. The indication icon is superimposed on the street position in the current image and transparency of the projection glass can be adjusted according to light intensity of environment. Thus, the vehicle navigation projection system enables the different drivers to see the indication icon with the navigation function in any lighting environment, and achieves effect of providing the driver with the indication icon having the sense of augmented reality.

14 Claims, 7 Drawing Sheets

(51) Int. Cl.
    *G06F 3/01*           (2006.01)
    *G06F 3/0481*       (2013.01)
    *G06F 3/03*           (2006.01)

(52) U.S. Cl.
    CPC .......... *G02B 27/0101* (2013.01); *G06F 3/011* (2013.01); *G06F 3/017* (2013.01); *G06F 3/0304* (2013.01); *G06F 3/04817* (2013.01); *G01C 21/3632* (2013.01); *G01C 21/3697* (2013.01); *G02B 2027/014* (2013.01); *G02B 2027/0118* (2013.01); *G02B 2027/0138* (2013.01)

(58) Field of Classification Search
    CPC . G01C 21/3638; G06F 3/017; G06F 3/04817; G06F 3/0304; G06F 3/011; G02B 27/0101; G02B 2027/014; G02B 2027/0118; G02B 2027/0138
    See application file for complete search history.

(56) References Cited

U.S. PATENT DOCUMENTS

2016/0307346 A1*   10/2016   Staudenmaier .......... G09G 5/38
2017/0036601 A1*    2/2017   Kimura .................... B60R 1/00

* cited by examiner

VEHICLE NAVIGATION PROJECTION SYSTEM AND METHOD THEREOF

CROSS-REFERENCE TO RELATED APPLICATION

This application claims the benefit of Chinese Patent Application No. 201611144718.3, filed Dec. 13, 2016.

BACKGROUND

Field of the Invention

The present disclosure relates to a navigation system and a method thereof, more particularly to a vehicle navigation projection system and a method thereof.

Description of the Related Art

In recent years, navigation systems are widely used to assist drivers in moving to destinations. The existing navigation system is able to generate multiple navigation paths according to a particular starting position and a destination position, and then calculate travel time of each navigation path according to a path length and road grades of each navigation path, and a display and a loudspeaker of the navigation system respectively show and broadcast a navigation message to instruct the driver with a route to the destination.

Furthermore, the navigation system may be installed with a head-up display (HUD) system configured to display navigation message to facilitate the driver to use the navigation system. The head-up display system projects a virtual image on a particular area of the windshield at the driver's eye level, so that the driver may directly view the navigation message without moving line-of-sight from the road. As a result, the head-up display system may improve driving safety for the driver.

However, the conventional head-up display system displays the image on a limited area of the windshield, and a size of the image projected on the specific area of the windshield is not easy to control, so different driver must adjust a projection position of the head-up display device in advance to clearly view the projected navigation image.

Therefore, the conventional technology has the problem that the different driver must adjust the projection position of the head-up display device in advance to clearly view the projected navigation image. What is need is to improve the navigation display system to solve the problem.

SUMMARY

An objective of the present disclosure is to provide a vehicle navigation projection system and a method thereof to solve aforementioned problem.

According to an embodiment, the present disclosure provides a vehicle navigation projection system disposed in a vehicle. The vehicle navigation projection system includes a navigation device, an image capture device, a projection device and a projection glass. The navigation device is configured to receive a starting position and a destination position, and includes a storage module and a navigation module. The storage module is configured to store a digital map. The navigation module is electrically coupled to the storage module and configured to calculate a navigation route according to the starting position, the destination position and the digital map, and continuously detect a current position of the vehicle, and then generate a navigation signal for the current position. The image capture device is configured to capture a current image in front of a driver's seat of the vehicle. The projection glass is served as a windshield of the vehicle, and the projection glass is a switchable glass and is able to adjust transparency thereof according to light intensity of environment. The projection device is electrically coupled to the navigation device and the image capture device, and disposed on the top of the vehicle interior, and includes a processing module and projection module. The processing module is configured to receive and analyze the current image to obtain a contour of a street in the current image, and determine an indication icon according to the contour of the street and the navigation signal. The projection module is configured to project the indication icon on the projection glass. The indication icon is superimposed on a position of the street in the current image.

According to an embodiment, the present disclosure provides a vehicle navigation projection method including following steps: receiving a starting position and a destination position; storing a digital map; calculating a navigation route according to the starting position, the destination position and the digital map, and continuously detecting a current position of the vehicle, and then generating a navigation signal for the current position; capturing a current image in front of a driver's seat of the vehicle; using a projection device disposed on the top of the vehicle interior to receive and analyze the current image to obtain a contour of the street in the current image, and then determining an indication icon according to the contour of the street and the navigation signal; and using a projection module of the projection device to project the indication icon on a projection glass, wherein the indication icon is superimposed on a position of the street in the current image, and the projection glass is served as a windshield of the vehicle, and the projection glass is a switchable glass and able to adjust transparency thereof according to light intensity of environment.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
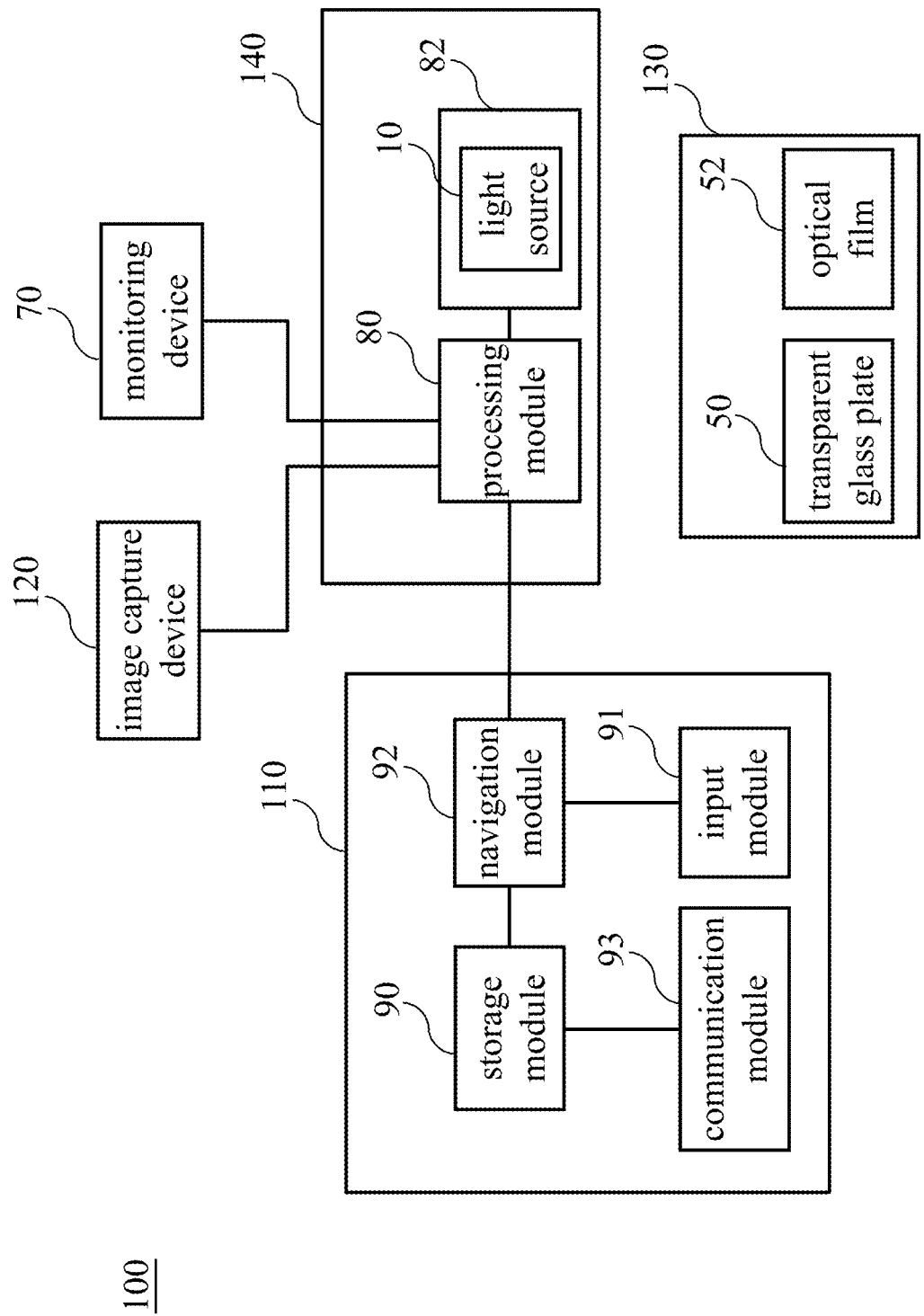
FIG. 1 is a system block diagram of an embodiment of a vehicle navigation projection system.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Please refer to FIG. 1, which is a system block diagram of an embodiment of a vehicle navigation projection system of the present disclosure. The vehicle navigation projection system 100 includes a navigation device 110, an image capture device 120, a projection glass 130 and a projection device 140. The navigation device 110 is configured to receive a starting position and a destination position, and includes a storage module 90 and a navigation module 92 which are electrically coupled to each other. The storage module 90 is configured to store a digital map, and the navigation module 92 is configured to calculate a navigation route according to the starting position, the destination position and the digital map, and continuously detect a current position of the vehicle, and then generate a current navigation signal for the current position. In this embodiment, the navigation signal may be an instruction indicating the driver to move straight ahead. Preferably, the storage module 90 may be a hard disk or memory device.

In this embodiment, the navigation device 110 further includes an input module 91 configured to provide an input interface for the driver to input the starting position and the destination position. Preferably, the input module 91 may be a keyboard or microphone; when the keyboard is used as the input module 91, the driver may input the starting position and the destination position by finger; when the microphone is used as the input module 91, the driver may input the starting position and the destination position by speech. Preferably, each of the starting position and the destination position may be an address, a special landmark, a school or a government office. The navigation device 110 may include a communication module 93 electrically coupled to the storage module 90. The digital map stored in the storage module 90 is updated through the communication module 93 periodically or irregularly, and the updating time for the digital map may be adjusted upon practical demand.

Figure 2:
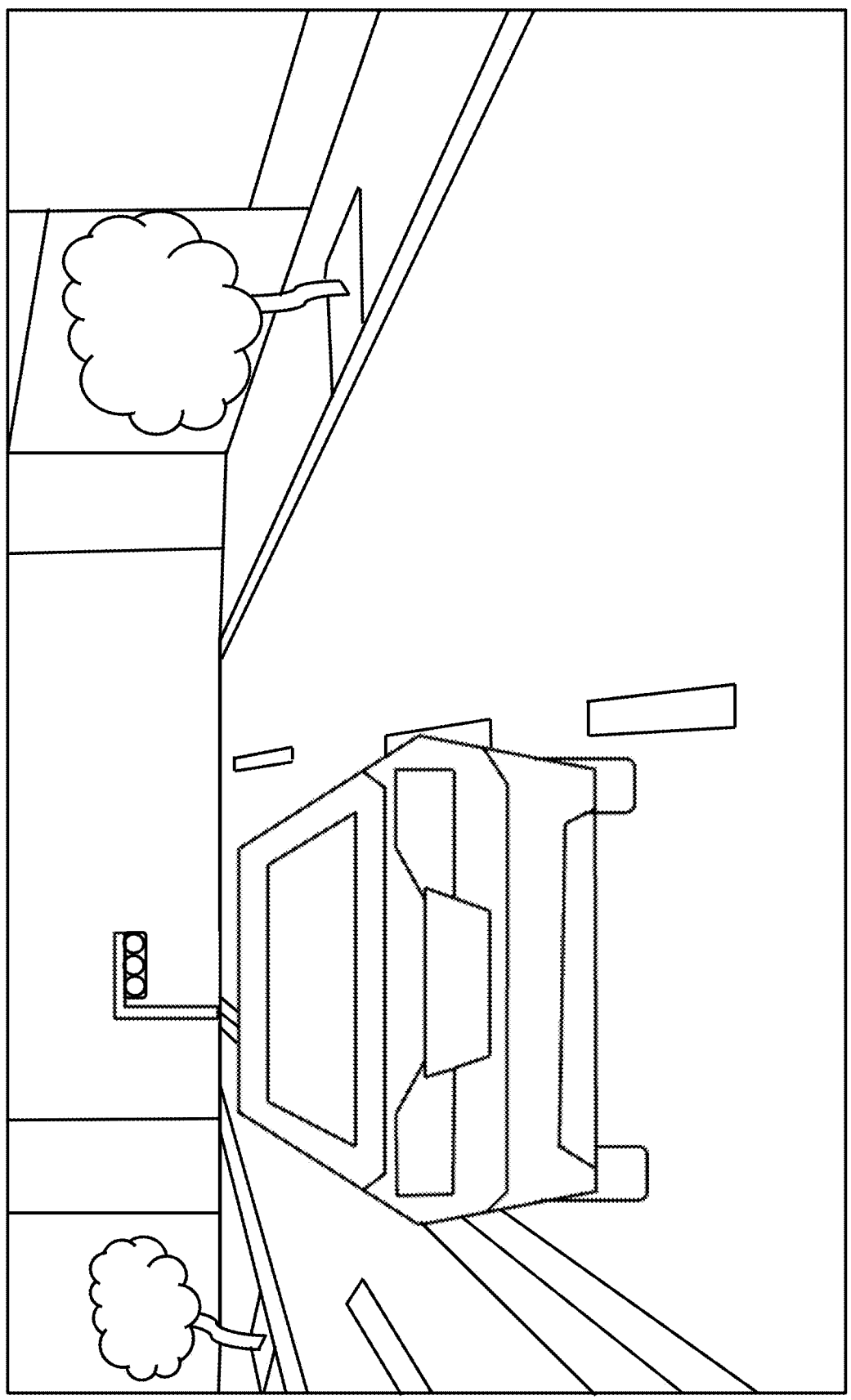
FIG. 2 is a schematic view of an embodiment of a current image in front of a driver's seat of the vehicle.

The image capture device 120 is configured to obtain a current image in front of the driver's seat of the vehicle, as shown in FIG. 2 which is a schematic view of an embodiment of the current image in front of the driver's seat of the vehicle. The current image captured by the image capture device 120 may be almost the same as the scene seen by the driver through a windshield while the driver sits at the seat, that is, a viewing angle of the image capture device 120 is close to or the same as the driver's viewing angle. Preferably, the image capture device 120 may be a digital still camera, a digital camcorder or a driving recorder, and the image capture device 120 may be mounted inside or outside the vehicle, and output the current image to the projection device 140 by a wired or wireless transmission manner. Alternatively, the image capture device 120 may be a wearable device worn on the driver and output the current image to the projection device 140 by the wireless transmission manner.

In this embodiment, the projection glass 130 is served as the windshield of the vehicle and is a switchable glass (or called as an electrically-controlled glass) which is able to adjust transparency thereof according to light intensity of environment, thereby improving contrast of the image projected by the projection device 140 on the projection glass. As a result, the projected image may satisfy the driver for high quality viewing even if in high lighting environment. In detail, the projection glass 130 uses a sensor (not shown in figures) to sense the light intensity of the environment in front of the vehicle, and uses a processing unit (not shown in figures) to adjust the transparency of the projection glass 130 according to the light intensity of the environment, so that the driver may see the image projected by the projection device 140 in any lighting environment without affecting the scene originally-viewable to the driver sitting at the seat through the windshield. Furthermore, in order to further improve the contrast of the image projected by the projection device 140 on the projection glass 130, the projection glass 130 may include a transparent glass plate 50 and an optical film 52 which is attached on the transparent glass plate 50, so that the image projected by the projection device 140 may be formed on the transparent glass plate 50. It should be noted that an area of the optical film 52 attached on the transparent glass plate 50 is not necessarily to be an entire area of the transparent glass plate 50, but the optical film 52 is at least attached on the area of the projection glass 130 where the projection device 140 may project the image.

Figure 3:
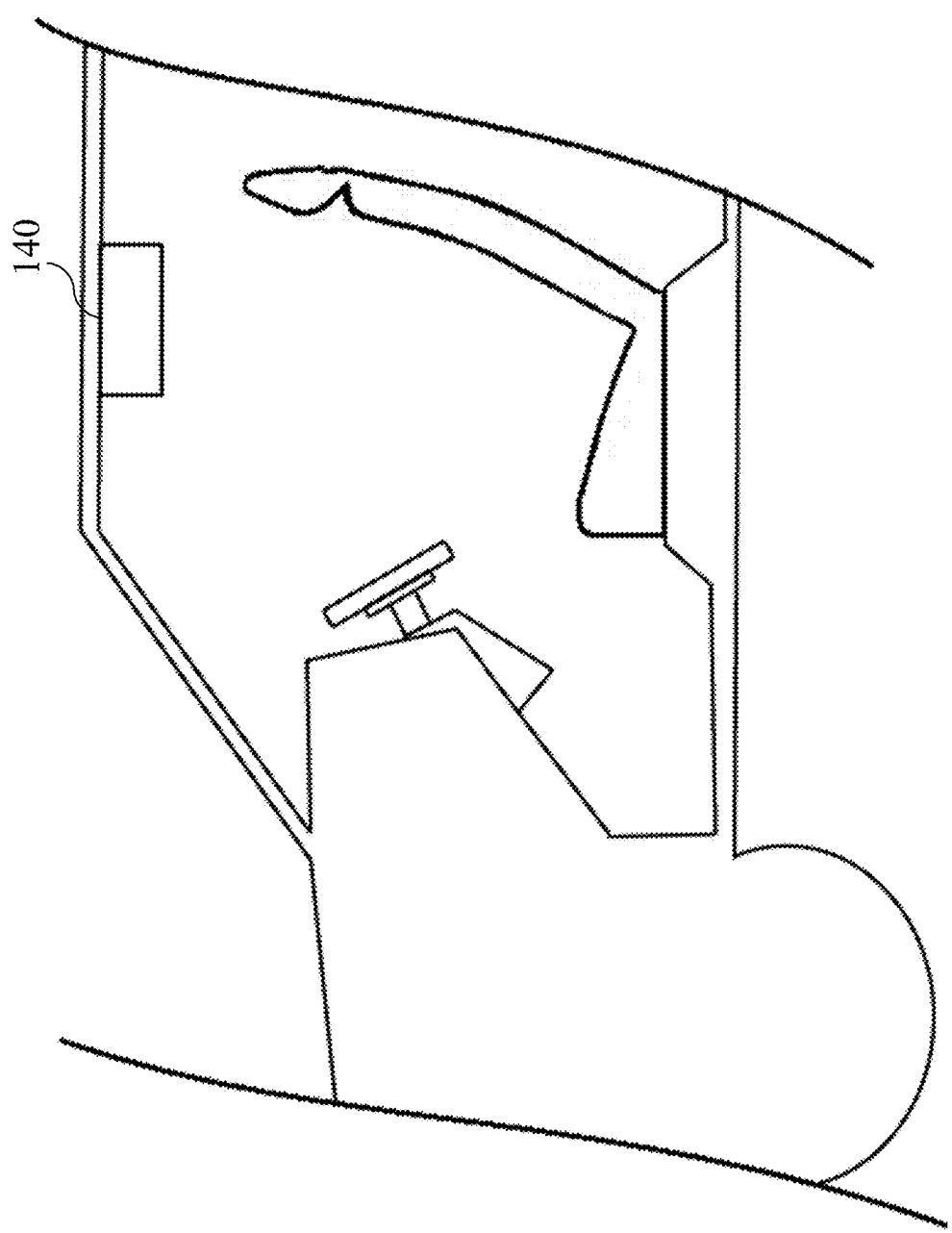
FIG. 3 is a schematic view of a disposition of a projection device.
Figure 4:
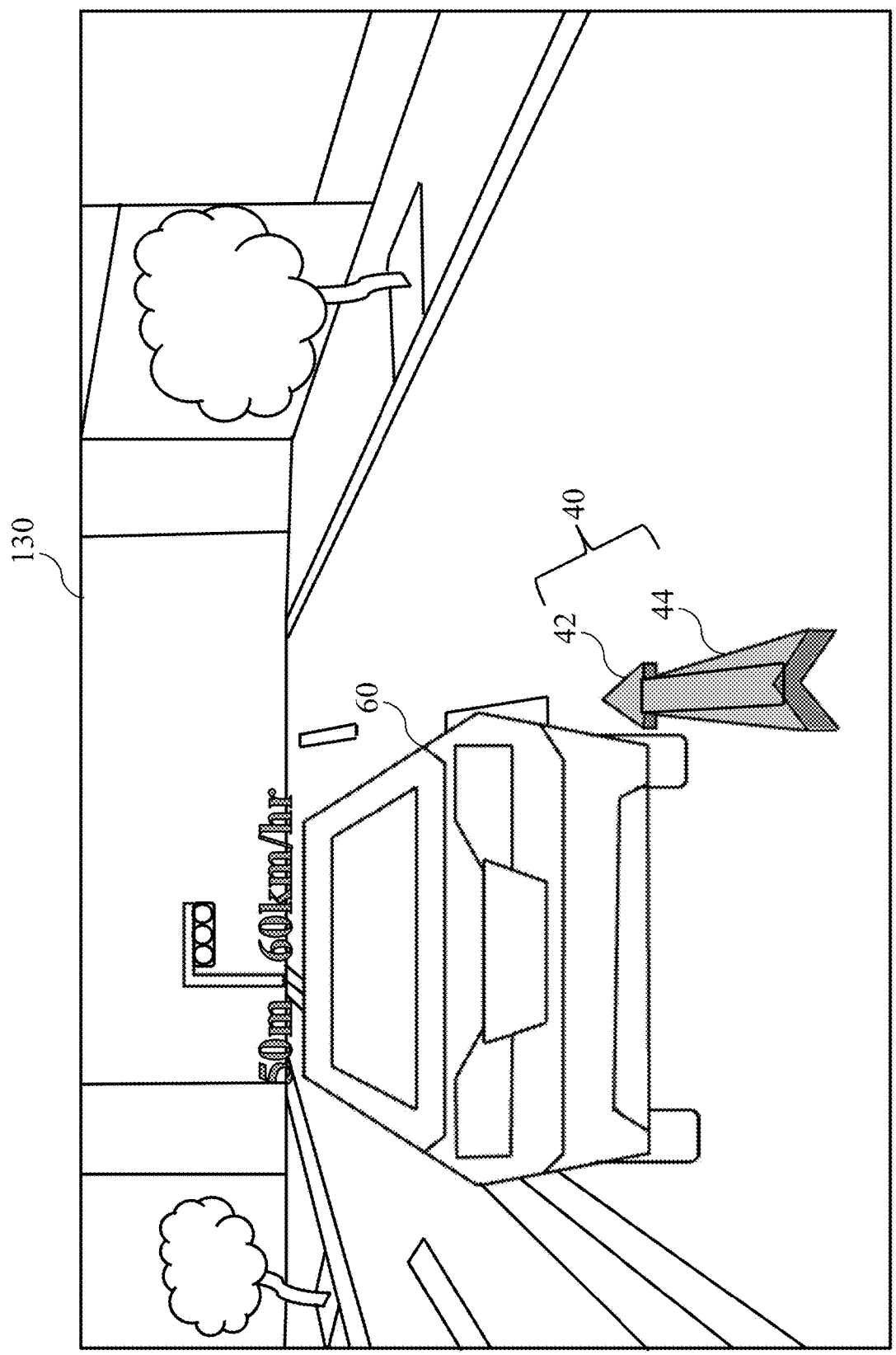
FIG. 4 is a schematic view of an embodiment of an image seen by the driver sitting at the seat.

Please refer to FIGS. 1, 3 and 4. FIG. 3 is a schematic view of disposition of an embodiment of the projection device of the present disclosure, and FIG. 4 is a schematic view of the image viewable to the driver sitting at the seat. The projection device 140 is electrically coupled to the navigation device 110 and the image capture device 120, and disposed at the top of the vehicle interior. Preferably, the projection device 140 may be electrically coupled to the navigation device 110 and the image capture device 120 by a wired or wireless manner. In this embodiment, the projection device 140 is electrically coupled to the navigation device 110 and the image capture device 120 by the wireless manner, but the present disclosure is not limited thereto and may be modified upon practical demand. The projection device 140 includes a processing module 80 and a projection module 82. The projection module 82 may include a light source 10. Preferably, the light source 10 may also be served as interior light of the vehicle. In other words, the light source 10 may provide light for image projection of the projection module 82 and provide illumination for the driver or passenger inside the vehicle; however, the present disclosure is not limited to this embodiment.

The processing module 80 is configured to receive and analyze the current image, to obtain a contour of a street in the current image, and determine an indication icon 40, such as the gray icon shown in FIG. 4, according to the contour of the street and the navigation signal. The projection module 82 is configured to project the indication icon 40 on the projection glass 130, and the indication icon 40 is superimposed on a position of the street in the current image. It should be noted that when the current image captured by the image capture device 120 is different from the scene viewed by the driver through the windshield while the driver sits at the seat (that is, the viewing angle of the image capture device 120 is different from the driver's viewing angle), the processing module 80 adjusts the current image prior to the analysis for the current image to make the adjusted current image the same as the scene viewed by the driver through the windshield while the driver sits at the seat, and then determines a projection position of the indication icon 40 on the projection glass 130. The indication icon 40 includes an arrow head 42 and an arrow body 44, and the processing module 80 determines a contour of the arrow body 44 according to the contour of the street in the current image, and determines a direction of the arrow head 42 according to the navigation signal, so that the indication icon 40 may be displayed with more sense of augmented reality, that is, the indication icon 40 looks more like an augmented reality image. In this embodiment, the contour of the arrow body may be an inclined straight arrow body extended forwardly, and the direction of the arrow head 42 may be a direction indicative of moving forwardly and straightly; however, the present disclosure is not limited to this embodiment. It should be noted that the indication icon 40 does not block the original scene viewable to the driver at the seat, that is, the driver can see a front object through the indication icon 40.

Furthermore, the vehicle of different type may have the windshield with different radian, in this embodiment, the projection glass 130 served as the windshield of the vehicle may have a different radian, so the processing module 80 may adjust the contour of the indication icon 40 according to the radian, so that the driver may see the indication icon 40 with sense of augmented reality in any type of vehicle.

The vehicle navigation display system 100 may include a monitoring device 70 electrically coupled to the projection device 140 and configured to detect and output a current velocity of a front vehicle 60 in the current image and a current distance between the front vehicle 60 and the vehicle, and the projection module 82 projects the current velocity and the current distance superimposed above the front vehicle 60 in the current image (such as the gray number shown in FIG. 4) for the driver to read the information about the front vehicle 60, thereby improving driving safety. In this embodiment, the current velocity of the front vehicle 60 is 60 km/hr, and the current distance between the front vehicle 60 and the vehicle is 50 m; however, the present disclosure is not limited to this embodiment.

Figure 5:
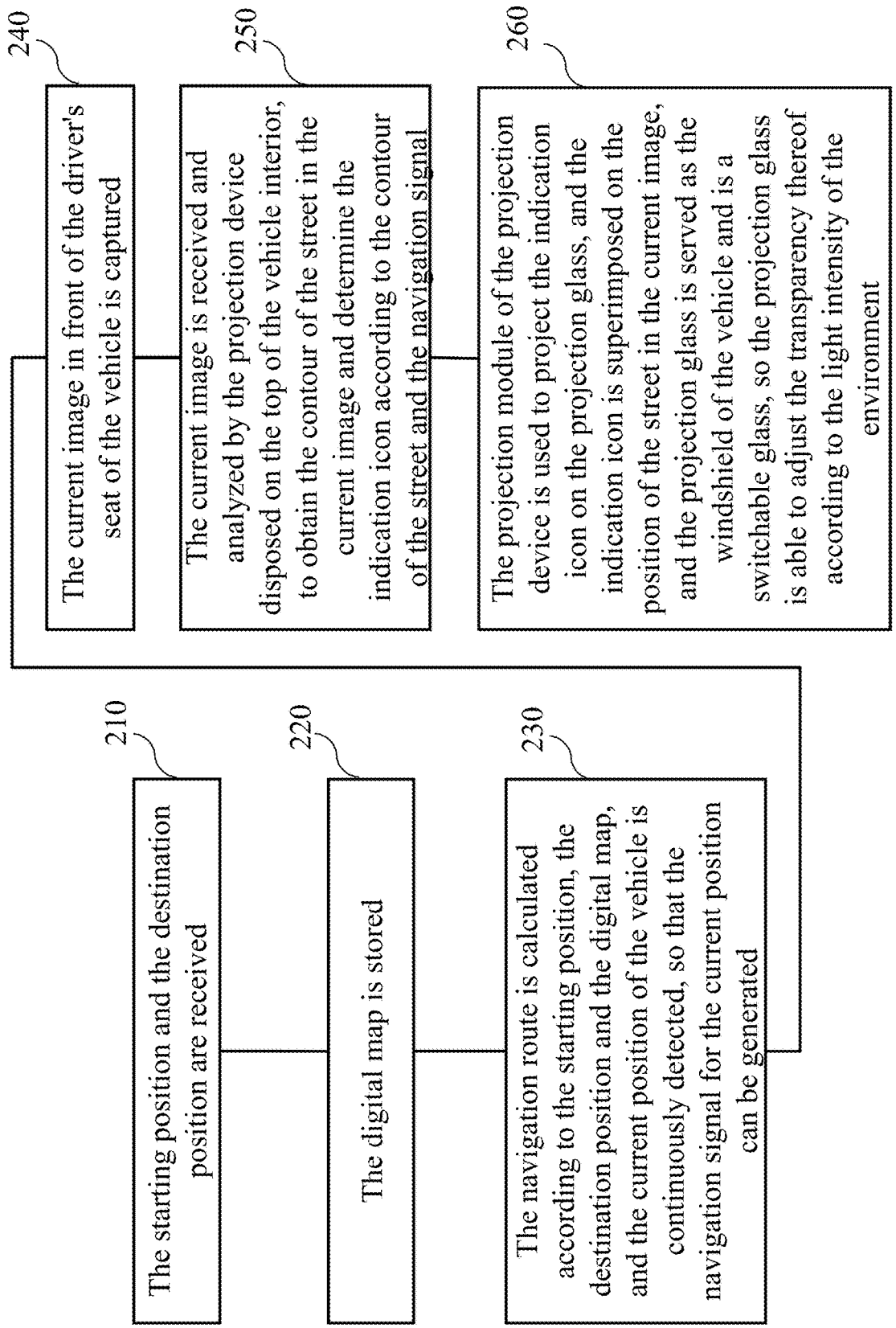
FIG. 5 is a flowchart showing the steps in an operation of a vehicle navigation projection method for the vehicle navigation projection system of FIG. 1.

Please refer to FIG. 5 which is a flowchart showing the steps in an operation of a vehicle navigation projection method for the navigation projection system of FIG. 1. The vehicle navigation projection method includes following steps. In a step 210, the starting position and the destination position are received. In a step 220, the digital map is stored. Next, in a step 230, the navigation route is calculated according to the starting position, the destination position and the digital map, and the current position of the vehicle is continuously detected, so that the navigation signal for the current position can be generated. In a step 240, the current image in front of the driver's seat of the vehicle is captured. In a step 250, the current image is received and analyzed by the projection device disposed on the top of the vehicle interior, to obtain the contour of the street in the current image and determine the indication icon according to the contour of the street and the navigation signal. In a step 260, the projection module of the projection device is used to project the indication icon on the projection glass, and the indication icon is superimposed on the position of the street in the current image, and the projection glass is served as the windshield of the vehicle and is a switchable glass, so the projection glass is able to adjust the transparency thereof according to the light intensity of the environment. Furthermore, the step of determining the indication icon according to the contour of the street and the navigation signal further includes steps of: determining the contour of the arrow body according to the contour of the street, and determining the direction of the arrow head according to the navigation signal, so that the indication icon projected on the projection glass may have the sense of the augmented reality.

Through above-mentioned steps, the projection module projects the indication icon on the projection glass which is served as the windshield of the vehicle, and the indication icon is superimposed on the position of the street in the current image, and the projection glass may adjust the transparency thereof according to the light intensity of the environment, so that the driver may clearly see the indication icon with the navigation function in any lighting environment and feel the indication icon with sense of augmented reality.

Furthermore, the vehicle navigation projection method may further include step of updating the digital map, so that the digital map stored in the storage module may be kept as the most update version.

Furthermore, the vehicle navigation projection method may also include steps of: detecting and outputting the current velocity of the front vehicle in the current image and the current distance between the front vehicle and the driver's vehicle; and projecting and superimposing the current velocity and the current distance above the front vehicle in the current image for the driver to read the information about the front vehicle, thereby improving driving safety.

Furthermore, the vehicle navigation projection method may further include steps of: providing the transparent glass plate and the optical film; attaching the optical film on the transparent glass plate, to make the indication icon be projected on the transparent glass plate, and the contrast of the image projected by the projection device on the projection glass may be further improved.

Furthermore, the vehicle navigation projection method may further include steps of adjusting the contour of the indication icon according to the radian of the projection glass, so that the driver may see the indication icon with sense of augmented reality in any type of vehicle having the windshield with different radian.

It is appreciated that aforementioned steps may be performed in any order unless a causal relationship between at least two steps is defined in context.

Figure 6:
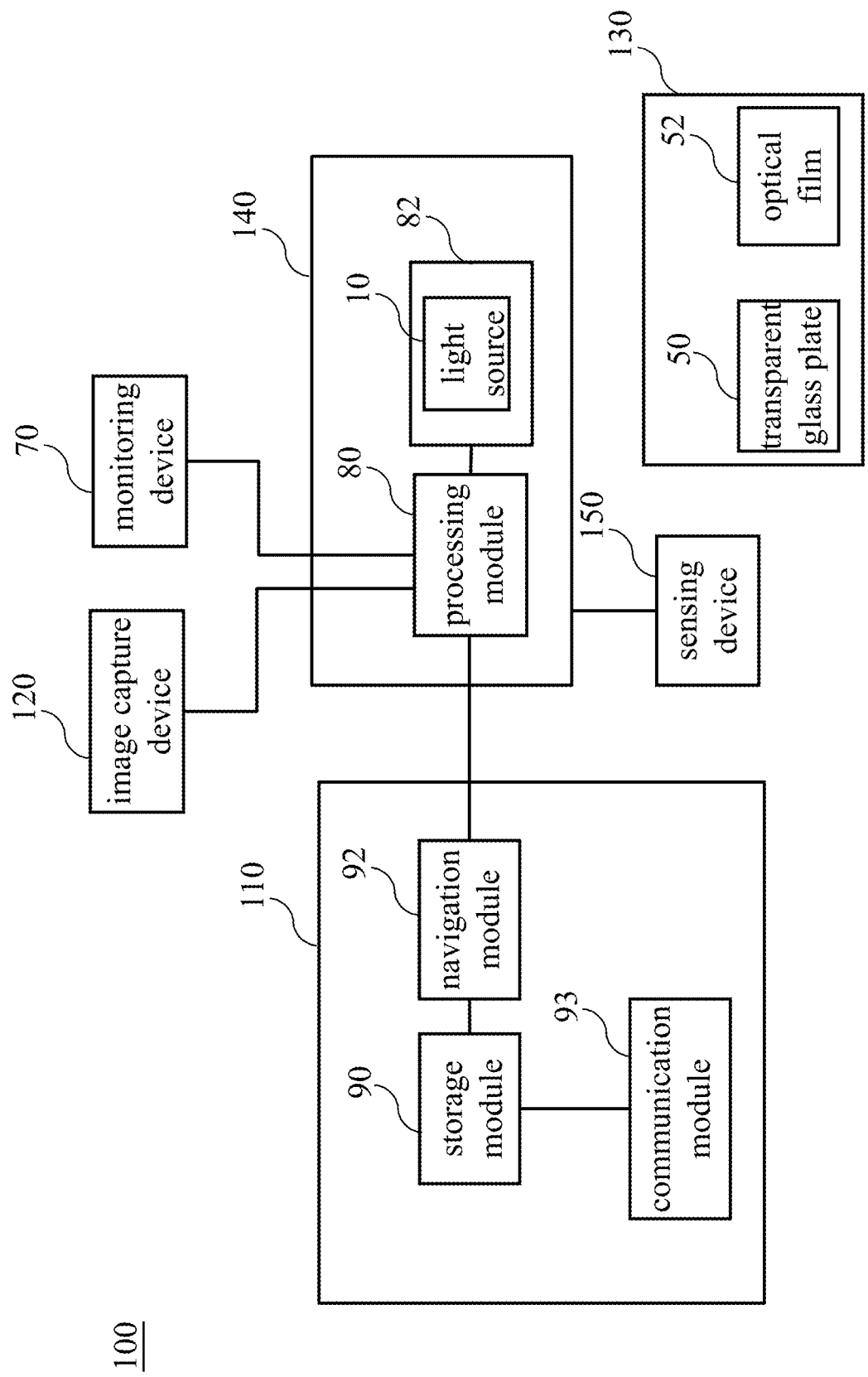
FIG. 6 is a system block diagram of other embodiment of the vehicle navigation projection system.

Please refer to FIG. 6, which is a system block diagram of other embodiment of the vehicle navigation projection system of the present disclosure. The difference between this embodiment and aforementioned embodiment is that the navigation device 110 of this embodiment does not include the input device 91, and in this embodiment the vehicle navigation projection system 100 may further include a sensing device 150 electrically coupled to the projection device 140, and the driver may use gestures to operate an input interface (such as a virtual keyboard) projected by the projection device 140, and the driver may use gestures to operate the input interface to input the starting position and the destination position, but the present disclosure is not limited to this embodiment. For example, the projection device 140 may project a keyboard image on the projection glass 130, and the sensing device 150 may sense an image of the driver's gestures for operating the keyboard image, and receive the starting position and the destination position inputted by the driver according to the image of the driver's gestures; however, above-mentioned description is an example for illustration, and the present disclosure is not limited thereto.

Figure 7:
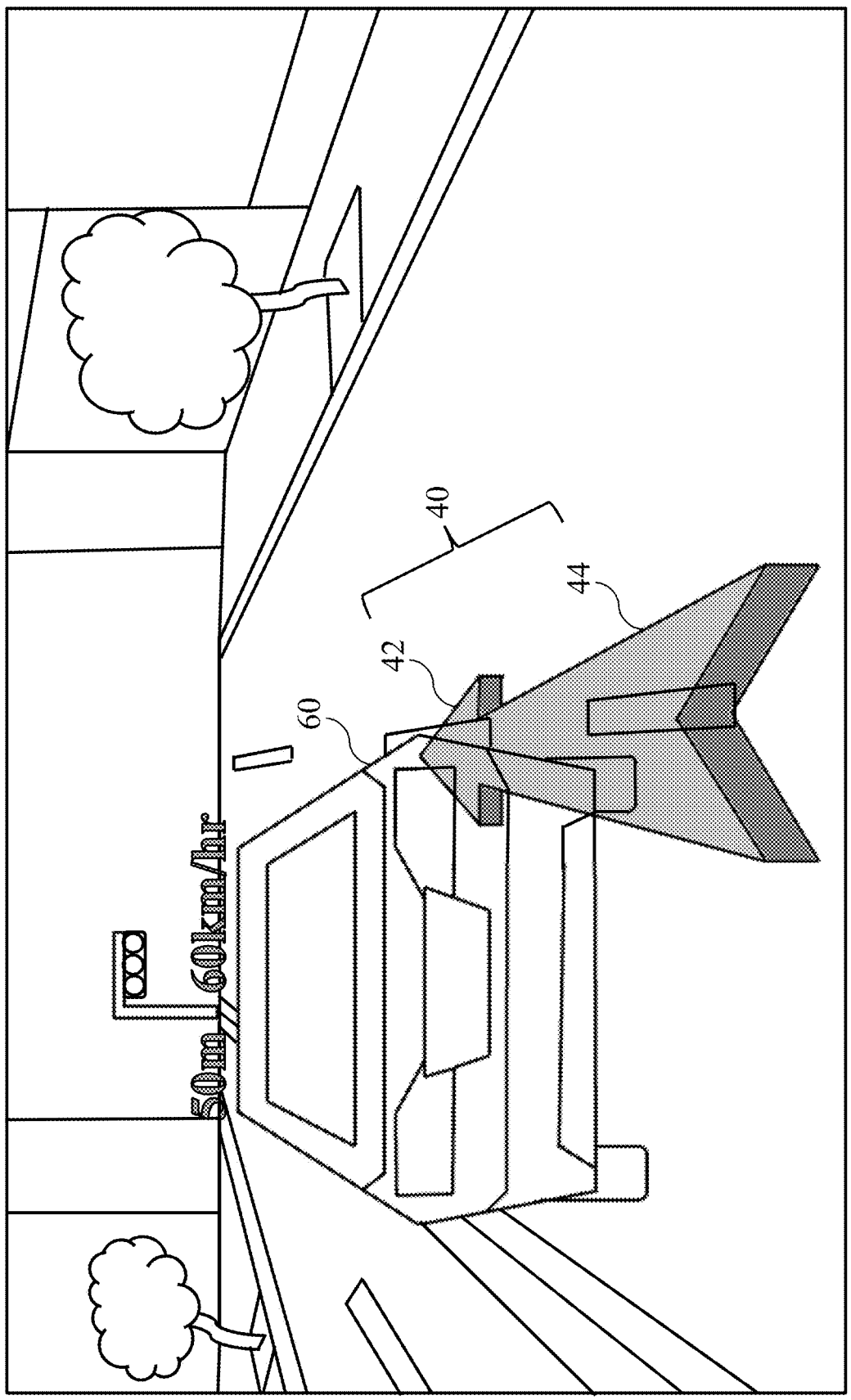
FIG. 7 is an enlarged view of the indication icon of FIG. 4.

Furthermore, the projection device 140 may adjust a size of the indication icon 40 according to the gesture sensed by the sensing device 150. For example, when the sensed gesture indicates an action of opening hand (that is, a release action), a function corresponding to this gesture is an enlarging function. When the gesture indicates a fisting action that indicates an action to grab something, a function corresponding to this gesture is a shrinking function; however, this example is merely for illustration and the present disclosure is not limited thereto. While the size of the indication icon 40 is being adjusted, the contour of the arrow body 44 is adjusted correspondingly in shape to the contour of the street in the current image. Please refer to FIGS. 6 and 7. FIG. 7 is a schematic view of enlargement of the indication icon of the FIG. 4. When the driver uses gesture to enlarge the indication icon 40 upon demand, the processing module 80 receives the enlarging instruction from the sensing device 150, and then enlarges the contour of the arrow body 44 correspondingly in shape to the contour of the street in the current image, thereby maintaining stereo perception of the enlarged indication icon 40, and enabling the driver to see the indication icon 40 with the sense of the augmented reality.

Besides the step shown in FIG. 5, the vehicle navigation projection method further includes steps: adjusting the size of the indication icon according to the gesture; and adjusting the contour of the arrow body correspondingly in shape to the contour of the street in the current image while the size of the indication icon is being adjusted, in order to maintain stereo perception of the indication icon. As a result, the driver may see the indication icon 40 with the sense of the augmented reality. It is appreciated that aforementioned steps may be performed in any order unless a causal relationship between at least two steps is defined in context.

To summarize, the difference between the present disclosure and the conventional technology is that the projection module of the present disclosure projects the indication icon on the projection glass which is served as the windshield of the vehicle, and the indication icon is superimposed on the street position of the current image, and the projection glass is able to adjust the transparency thereof according to the light intensity in the environment, thereby solving the problem existing in the conventional technology and achieving the effect of providing the driver to see the indication icon with sense of augmented reality in any lighting environment.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A vehicle navigation projection system, disposed in a vehicle, and the vehicle navigation projection system comprising:
 a navigation device, configured to:
  receive a starting position and a destination position;
  store a digital map;
  calculate a navigation route according to the starting position, the destination position and the digital map, and continuously detect a current position of the vehicle; and
  generate a navigation signal for the current position;
 an image capture device configured to capture a current image in front of a driver's seat of the vehicle;
 a projection glass, served as a windshield of the vehicle, wherein the projection glass is a switchable glass and is able to adjust transparency thereof according to light intensity of environment;
 a projection device electrically coupled to the navigation device and the image capture device, and disposed on the top of the vehicle interior, and configured to:
  receive and analyze the current image to obtain a contour of a street in the current image, and determine an indication icon according to the contour of the street and the navigation signal; and
  project the indication icon on the projection glass, wherein the indication icon is superimposed on a position of the street in the current image; and
 a monitoring device electrically coupled to the projection device and configured to detect and output a current velocity of a front vehicle in the current image and a current distance between the front vehicle and the vehicle, wherein the projection device projects and superimposes the current velocity and the current distance on a position above the front vehicle in the current image.

2. The vehicle navigation projection system according to claim 1, wherein the indication icon comprises an arrow head and an arrow body, and the projection device determines a contour of the arrow body according to the contour of the street in the current image, and determines a direction of the arrow head according to the navigation signal.

3. The vehicle navigation projection system according to claim 2, further comprising a sensing device electrically coupled to the projection device and configured to sense a gesture, wherein the projection device adjusts a size of the indication icon according to the gesture, and while the size of the indication icon is being adjusted, the contour of the arrow body is adjusted correspondingly to the contour of the street.

4. The vehicle navigation projection system according to claim 1, wherein the navigation wherein the navigation device is further configured to update the digital map.

5. The vehicle navigation projection system according to claim 1, wherein the projection glass comprises a transparent glass plate and an optical film which is attached on the transparent glass plate, to make the indication icon be projected on the transparent glass plate.

6. The vehicle navigation projection system according to claim 1, wherein the projection glass has a radian and the projection device adjusts the contour of the indication icon according to the radian.

7. The vehicle navigation projection system according to claim 1, wherein the projection device comprises a light source which is served as interior light in the vehicle.

8. The vehicle navigation projection system according to claim 1, wherein the image capture device is a driving recorder.

9. A vehicle navigation projection method, comprising:
 receiving a starting position and a destination position;
 storing a digital map;
 calculating a navigation route according to the starting position, the destination position and the digital map, and continuously detecting a current position of the vehicle, and then generating a navigation signal for the current position;

capturing a current image in front of a driver's seat of the vehicle;

using a projection device disposed on the top of the vehicle interior to receive and analyze the current image to obtain a contour of the street in the current image, and then determining an indication icon according to the contour of the street and the navigation signal;

using a projection module of the projection device to project the indication icon on a projection glass, wherein the indication icon is superimposed on a position of the street in the current image, and the projection glass is served as a windshield of the vehicle, and the projection glass is a switchable glass and able to adjust transparency thereof according to light intensity of environment;

detecting and outputting a current velocity of a front vehicle in the current image and a current distance between the front vehicle and the vehicle; and projecting and superimposing the current velocity and the current distance on a position above the front vehicle in the current image on the projection glass.

10. The vehicle navigation projection method according to claim 9, wherein the indication icon comprises an arrow head and an arrow body, and the step of determining the indication icon according to the contour of the street and the navigation signal further comprising:

determining a contour of the arrow body according to the contour of the street in the current image; and determining a direction of the arrow head according to the navigation signal.

11. The vehicle navigation projection method according to claim 10, further comprising:

sensing a gesture; and adjusting a size of the indication icon according to the gesture, wherein while the size of the indication icon is being adjusted, the contour of the arrow body is adjusted correspondingly to the contour of the street.

12. The vehicle navigation projection method according to claim 9, further comprising: updating the digital map.

13. The vehicle navigation projection method according to claim 9, further comprising:

providing a transparent glass plate and an optical film; and attaching the optical film on the transparent glass plate, to make the indication icon be projected on the transparent glass plate.

14. The vehicle navigation projection method according to claim 9, further comprising: adjusting the contour of the indication icon according to a radian of the projection glass.

* * * * *